US010429850B2

(12) United States Patent
Kato et al.

(10) Patent No.: US 10,429,850 B2
(45) Date of Patent: Oct. 1, 2019

(54) AUTOMATIC PARKING APPARATUS, PARKING GUIDANCE APPARATUS, AUTOMATIC PARKING METHOD, AND PARKING GUIDANCE METHOD

(71) Applicant: Mitsubishi Electric Corporation, Tokyo (JP)

(72) Inventors: Yoichi Kato, Tokyo (JP); Hirokazu Shimizu, Tokyo (JP); Nariaki Takehara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/585,375

(22) Filed: May 3, 2017

(65) Prior Publication Data

US 2018/0129218 A1  May 10, 2018

(30) Foreign Application Priority Data

Nov. 9, 2016  (JP) .................................. 2016-218665

(51) Int. Cl.
*G01C 22/00* (2006.01)
*G05D 1/02* (2006.01)
(Continued)

(52) U.S. Cl.
CPC ............. *G05D 1/0231* (2013.01); *B60R 1/00* (2013.01); *B62D 15/0285* (2013.01);
(Continued)

(58) Field of Classification Search
CPC ...... G05D 1/0231; G05D 1/0088; B60R 1/00; B60R 2300/806; G08G 1/14
USPC ............... 701/28, 25, 26; 348/118, E07.085; 180/204
See application file for complete search history.

(56) References Cited

U.S. PATENT DOCUMENTS

2008/0208680 A1\*  8/2008  Cho ........................ G06Q 20/32
705/13
2010/0010723 A1\*  1/2010  Taki ...................... B60W 30/08
701/102
(Continued)

FOREIGN PATENT DOCUMENTS

JP       10-269497 A    10/1998
JP       2005-41433 A    2/2005
(Continued)

OTHER PUBLICATIONS

Communication dated Aug. 15, 2017 from the Japanese Patent Office in counterpart Application No. 2016-218665.

*Primary Examiner* — Shardul D Patel
(74) *Attorney, Agent, or Firm* — Sughrue Mion, PLLC; Richard C. Turner

(57) ABSTRACT

Provided are an automatic parking apparatus and the like, which are capable of easily setting a target parking area and moving or guiding a vehicle to the target parking area. The automatic parking apparatus includes: a monitor device configured to photograph surroundings of an own vehicle; an image display device including: a display screen configured to display an image obtained through the photographing by the monitor device; an image generation unit configured to generate an image to be displayed on the display screen from the image obtained through the photographing, and to display the image; and an input device; and a vehicle control device configured to control the own vehicle to move to a parking area, which is designated through the input device with respect to the displayed image.

16 Claims, 12 Drawing Sheets

(51) Int. Cl.
  *B60R 1/00*     (2006.01)
  *G05D 1/00*     (2006.01)
  *G08G 1/14*     (2006.01)
  *B62D 15/02*    (2006.01)
  *G08G 1/16*     (2006.01)

(52) U.S. Cl.
  CPC ............. *G05D 1/0088* (2013.01); *G08G 1/14* (2013.01); *G08G 1/142* (2013.01); *G08G 1/143* (2013.01); *G08G 1/168* (2013.01); *B60R 2300/806* (2013.01)

(56) References Cited

U.S. PATENT DOCUMENTS

| | | | |
|---|---|---|---|
| 2012/0101660 A1* | 4/2012 | Hattori | G05D 1/0022 701/2 |
| 2014/0172220 A1* | 6/2014 | You | G05D 1/0297 701/23 |
| 2014/0197939 A1* | 7/2014 | Stefan | B60Q 9/008 340/435 |
| 2014/0244095 A1* | 8/2014 | Choi | B62D 15/0285 701/25 |
| 2015/0151789 A1* | 6/2015 | Lee | B62D 15/0285 701/41 |
| 2015/0353080 A1* | 12/2015 | Mukaiyama | E05B 77/54 701/23 |
| 2017/0036695 A1* | 2/2017 | Lee | B62D 15/0285 |
| 2017/0096167 A1* | 4/2017 | Yoon | B60R 1/00 |
| 2018/0237069 A1* | 8/2018 | Gehin | B62D 15/0285 |

FOREIGN PATENT DOCUMENTS

| | | |
|---|---|---|
| JP | 2007-118878 A | 5/2007 |
| JP | 2008-9913 A | 1/2008 |
| JP | 2013-216307 A | 10/2013 |

* cited by examiner

AUTOMATIC PARKING APPARATUS, PARKING GUIDANCE APPARATUS, AUTOMATIC PARKING METHOD, AND PARKING GUIDANCE METHOD

BACKGROUND OF THE INVENTION

1. Field of the Invention

The present invention relates to an automatic parking apparatus configured to move a vehicle to a parking space through an operation conducted inside the vehicle, a parking guidance apparatus configured to move a vehicle through a remote operation conducted outside the vehicle, and methods therefor.

2. Description of the Related Art

Hitherto, a vehicle recognizes an entrance of a parking section designated by an entrance designation indication, e.g., a marker. Further, the vehicle calculates a traveling track of the own vehicle to be required until the vehicle reaches a parking space, i.e., a parking area, after passing through the entrance. In the related art, the vehicle is automatically moved to the parking area along the traveling track by controlling a travel driving force, a braking force, steering, and an automatic transmission of the own vehicle.

The marker provided in the parking lot and formed of, for example, a white line within the parking lot, is recognized by a marker recognition device, and the vehicle is automatically moved to a predetermined parking area through the recognition of the marker. For example, in Japanese Patent Application Laid-open No. Hei 10-269497, the marker provided in the parking lot is used to set a target parking section, and the vehicle is moved or guided to the target parking section.

The above-mentioned automatic parking apparatus of Japanese Patent Application Laid-open No. Hei 10-269497 cannot be used in a parking lot where the marker, e.g., the white line, is not provided to the parking space. That is, the vehicle cannot be moved or guided to a space in which a user wishes to park the vehicle irrespective of whether or not the marker is provided in the parking lot.

SUMMARY OF THE INVENTION

The present invention has been made in order to solve the above-mentioned problem, and has an object to provide an automatic parking apparatus, a parking guidance apparatus, and methods therefor, which are capable of easily setting a target parking area and moving or guiding a vehicle to the target parking area.

According to one embodiment of the present invention, there are provided an automatic parking apparatus and the like, including: a monitor device configured to photograph surroundings of an own vehicle; an image display device including: a display screen configured to display an image obtained through the photographing by the monitor device; an image generation unit configured to generate an image to be displayed on the display screen from the image obtained through the photographing, and to display the image; and an input device; and a vehicle control device configured to control the own vehicle to move to a parking area designated, which is designated through the input device with respect to the displayed image.

According to the present invention, it is possible to easily set the target parking area and move or guide the vehicle to the target parking area.

DESCRIPTION OF THE EMBODIMENTS

Now, an automatic parking apparatus and a parking guidance apparatus according to embodiments of the present invention are described referring to the accompanying drawings. In the respective embodiments, the same components or corresponding components are denoted by the same reference symbols, and the overlapping description thereof is herein omitted.

First Embodiment

Figure 1:
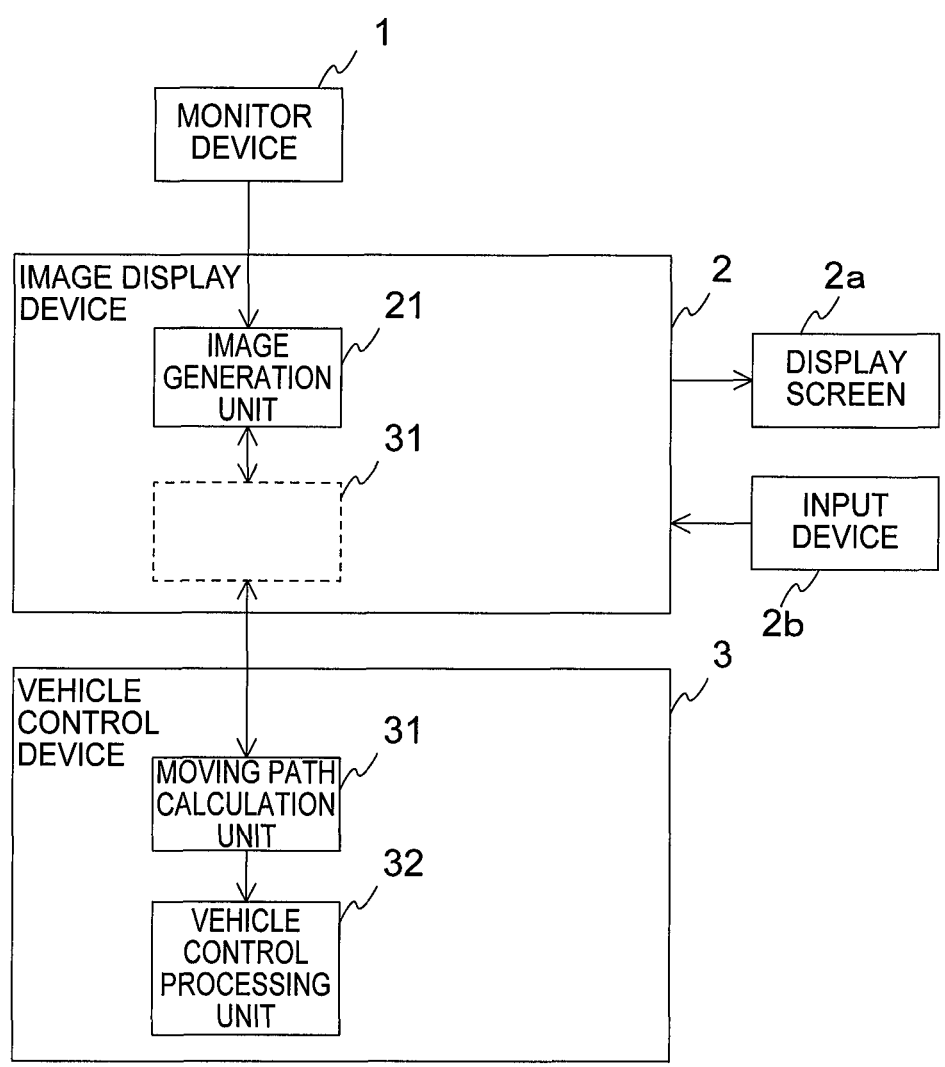
FIG. 1 is a block diagram for illustrating a configuration of an automatic parking apparatus according to a first embodiment of the present invention.

In a first embodiment of the present invention, a description is made of an operation of the automatic parking apparatus configured to display an image, which is obtained through photographing by a monitor device configured to photograph surroundings of an own vehicle, on a display screen inside the own vehicle, and move the own vehicle to a target parking area designated within the image by a user. FIG. 1 is a block diagram for illustrating a configuration of the automatic parking apparatus according to the first embodiment of the present invention.

A monitor device 1 is mounted to a vehicle, and is configured to photograph the surroundings of the own vehicle.

An image display device 2 is configured to display an image obtained through the photographing by the monitor device 1, and to receive an input operation from the user.

A vehicle control device 3 is configured to control the own vehicle based on the input operation received from the user.

The image display device 2 includes: an image generation unit 21 configured to convert the image obtained through the photographing by the monitor device 1 into a bird's-eye view image; a display screen 2a configured to display the generated image; and an input device 2b configured to receive, for example, the input operation for the target parking area from the user.

The vehicle control device 3 includes: a moving path calculation unit 31 configured to calculate a moving path of the vehicle from a relationship between an own vehicle location area at present, that is, at a start time of a parking operation and the target parking area based on the input operation for the target parking area received from the user; and a vehicle control processing unit 32 configured to control the driving of the vehicle based on the calculated moving path. It is assumed here that the target parking area and the own vehicle location area at the start time of the parking operation each have an area and a shape corresponding to the shape of a target vehicle.

In FIG. 1, the arrows each indicate how a signal flows.

Figure 2:
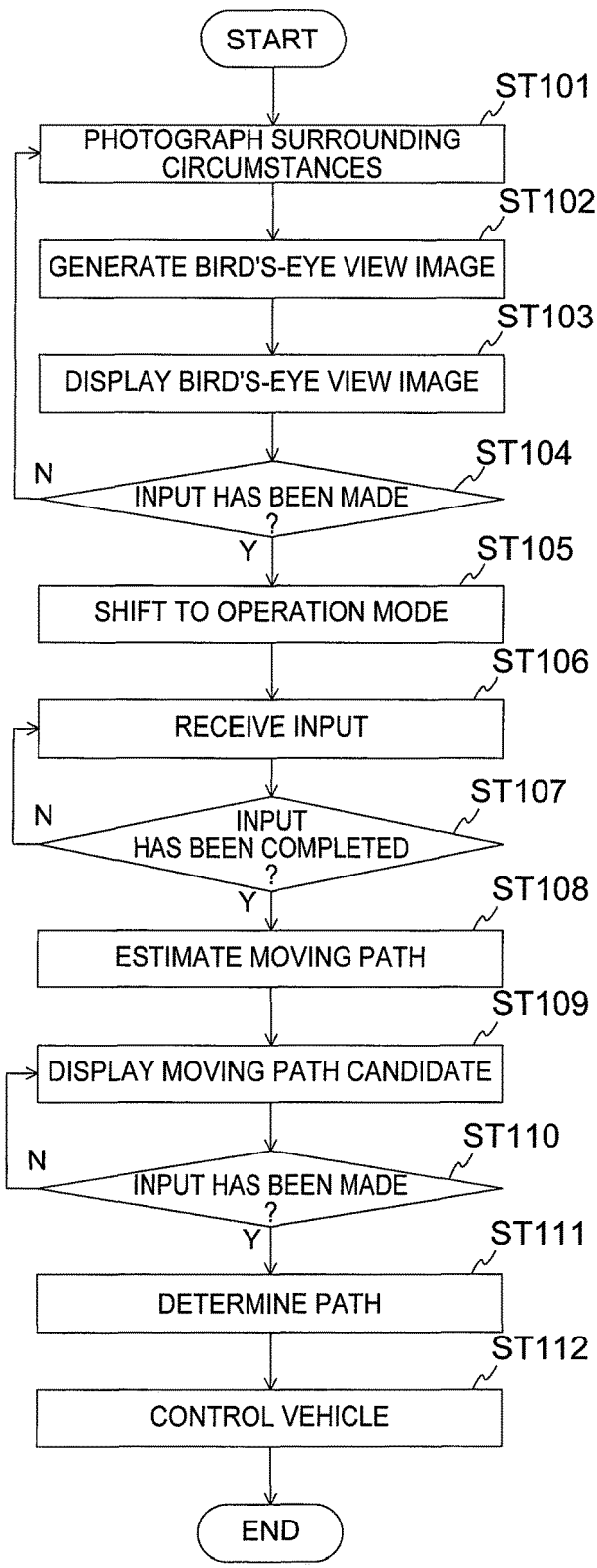
FIG. 2 is a flowchart for illustrating an example of an operation of the automatic parking apparatus according to the first embodiment of the present invention.

FIG. 2 is a flowchart for illustrating an example of the operation of the automatic parking apparatus according to the first embodiment of the present invention. Operations of the respective components illustrated in FIG. 1 are described below.

First, the monitor device 1 mounted to the own vehicle photographs a surrounding environment of the own vehicle (Step ST101). The monitor device 1 aims at photographing the surroundings of the vehicle and presenting the surrounding environment around the own vehicle to the user as the bird's-eye view image. Therefore, not only one camera but a plurality of cameras may be mounted.

The image data obtained through the photographing is input to the image generation unit 21 to generate the bird's-eye view image (Step ST102). Examples of a method of generating the bird's-eye view image include a method of deforming the respective images obtained through the photographing by cameras, which are mounted at four spots on the front, rear, left, and right sides of the vehicle, based on a transformation corresponding to mounted positions of the cameras, and further joining the images, to thereby generate the bird's-eye view image. Such a monitor device is known as a multi-angle around-view monitor, and, for example, there is obtained an around-view image in which the own vehicle location area is at the center of the image.

Figure 3:
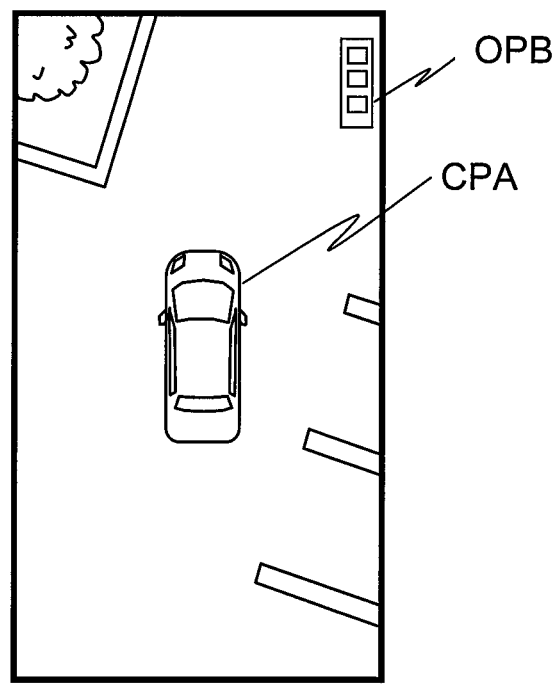
FIG. 3 is a diagram for illustrating an example of a bird's-eye view image to be displayed on a display screen according to one embodiment of the present invention.

The generated bird's-eye view image is input to the display screen 2a, and displayed so as to be able to be confirmed by the user (Step ST103). In this manner, the image obtained through the photographing by the monitor device 1 is constantly updated in real time. In this case, the bird's-eye view image is displayed as illustrated in, for example, FIG. 3. An image for illustrating an own vehicle location area CPA at the start time of the parking operation is arranged at the center of the image, and a view of the surroundings is displayed as a bird's-eye view image.

In this case, when the user wishes to automatically park the vehicle to a desired area on the display screen 2a, the user conducts an input operation on the image display device 2 through use of the input device 2b (Step ST104). The input device 2b may be, for example, a transparent touch panel formed on the display screen 2a or an operation button existing separately from the display screen 2a. As an input method, the touch operation may be conducted for a button OPB displayed on the touch panel, which is representatively illustrated in FIG. 3.

When the input is started, the image generation unit 21 shifts to a user operation mode (Step ST105), and prompts the user to designate the target parking area through, for example, dedicated display on the display screen 2a.

After that, the image generation unit 21 continues to receive an operation for designating the target parking area from the user until an input completion operation is conducted (Step ST106).

Figure 4:
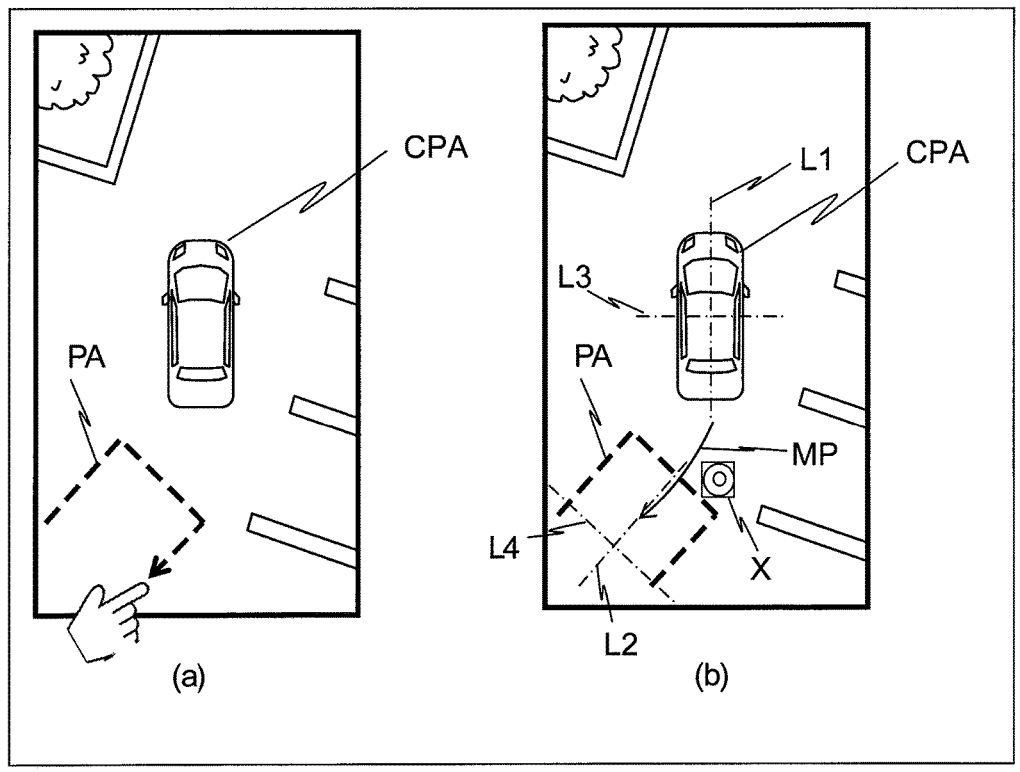
FIG. 4 is a diagram for illustrating an example of an operation for setting a target parking area according to one embodiment of the present invention.

As an operation for inputting the target parking area conducted in this case, there is a method of drawing a rectangle based on the user's touch operation conducted for the touch panel on the display screen 2a as indicated by the broken line PA in FIG. 4, for example.

Figure 5:
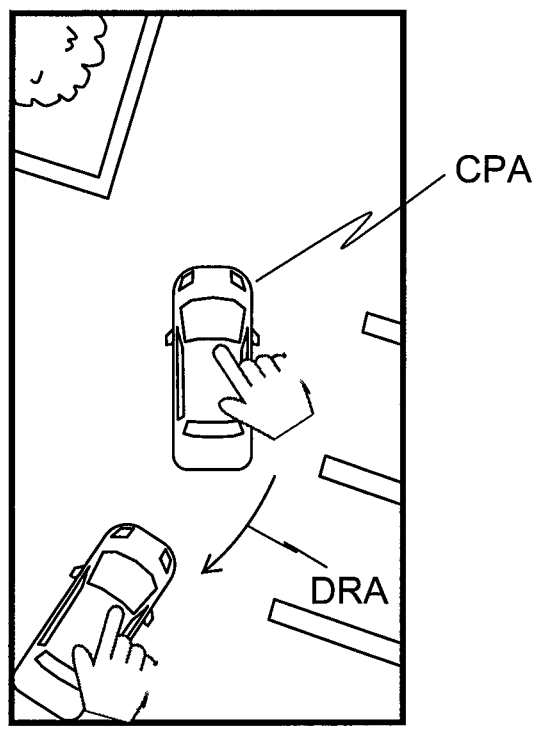
FIG. 5 is a diagram for illustrating another example of the operation for setting the target parking area according to one embodiment of the present invention.

There is also another method of moving an own vehicle location area mark indicating the own vehicle location area CPA displayed at the center of the bird's-eye view image through a slide operation, namely, a dragging operation, as indicated by the arrow DRA in FIG. 5.

Figure 6:
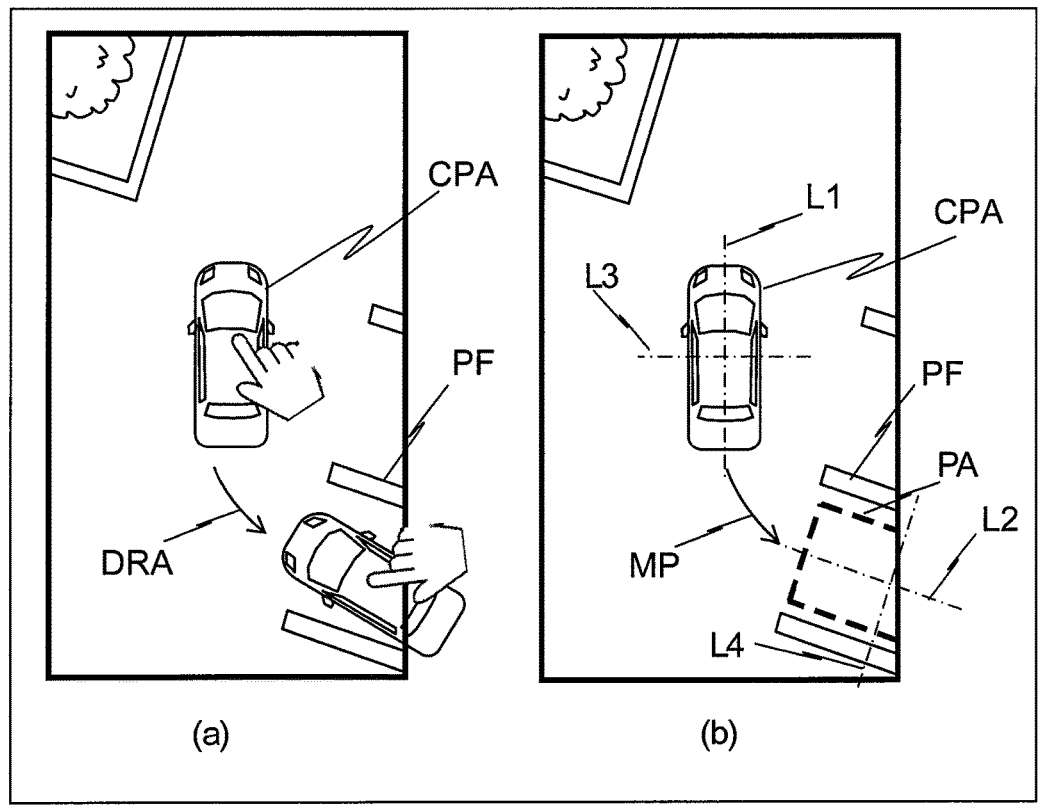
FIG. 6 is a diagram for illustrating yet another example of the operation for setting the target parking area according to one embodiment of the present invention.

When the method illustrated in FIG. 5 is used, in a case where, as further illustrated in FIG. 6, an actual parking frame PF exists at a destination of the user's dragging operation DRA, a deviation with respect to the parking frame PF may be automatically corrected to set a target parking area PA. In a correction operation conducted in this case, for example, a white line being the parking frame PF existing in the bird's-eye view image is detected through image processing. Then, the parking area PA set by conducting the sliding operation for the own vehicle location area CPA mark at the start time of the parking operation with respect to the position of the white line is set and displayed after such a correction that the parking area PA becomes an area satisfying a preset condition within the parking frame PF.

The area satisfying the preset condition used in this case means that, in terms of a lateral direction of the vehicle, for example, a central line of the parking area PA along a longitudinal direction of the vehicle is set to match a center line of the parking frame PF along a parking direction of the vehicle. The above-mentioned area also means that, in terms of the longitudinal direction of the vehicle, for example, a center line of the parking area PA along the lateral direction of the vehicle is set to match the center line of the parking frame PF along a direction perpendicular to the parking direction of the vehicle. In this case, as a method of obtaining a position of the center line of the parking area PA along the lateral direction of the vehicle, there is a method of calculating the position through use of a width of PA and an aspect ratio of CPA. As another method, the center line of the parking area PA may be set so as to deviate from the center line of the parking frame PF by a preset amount in each of the lateral direction and the longitudinal direction of the vehicle. A reference line is not limited to the center line, and a reference line along any one of left and right ends or a reference line along any one of front and rear ends may be set.

When the user conducts the input completion operation, the image generation unit 21 determines that the input has been completed (Step ST107). It is assumed that the input completion operation is conducted in this case when, for example, the user's finger is lifted off the touch panel during the above-mentioned operation. In another case, for example, the user may touch a displayed completion button OBP to complete the input.

When the parking area PA is designated by the user's completion of the input, coordinate information on the own vehicle location area CPA and the designated parking area PA on the screen are input from the image generation unit 21 to the moving path calculation unit 31 of the vehicle control device 3, and the moving path is estimated (Step ST108). In processing for estimating the moving path conducted above, the moving path is estimated from a vehicle size of the own vehicle, a turnable radius thereof, and the like in addition to a positional relationship between the coordinate information on the own vehicle location area CPA and the designated parking area PA on the screen.

Figure 7:
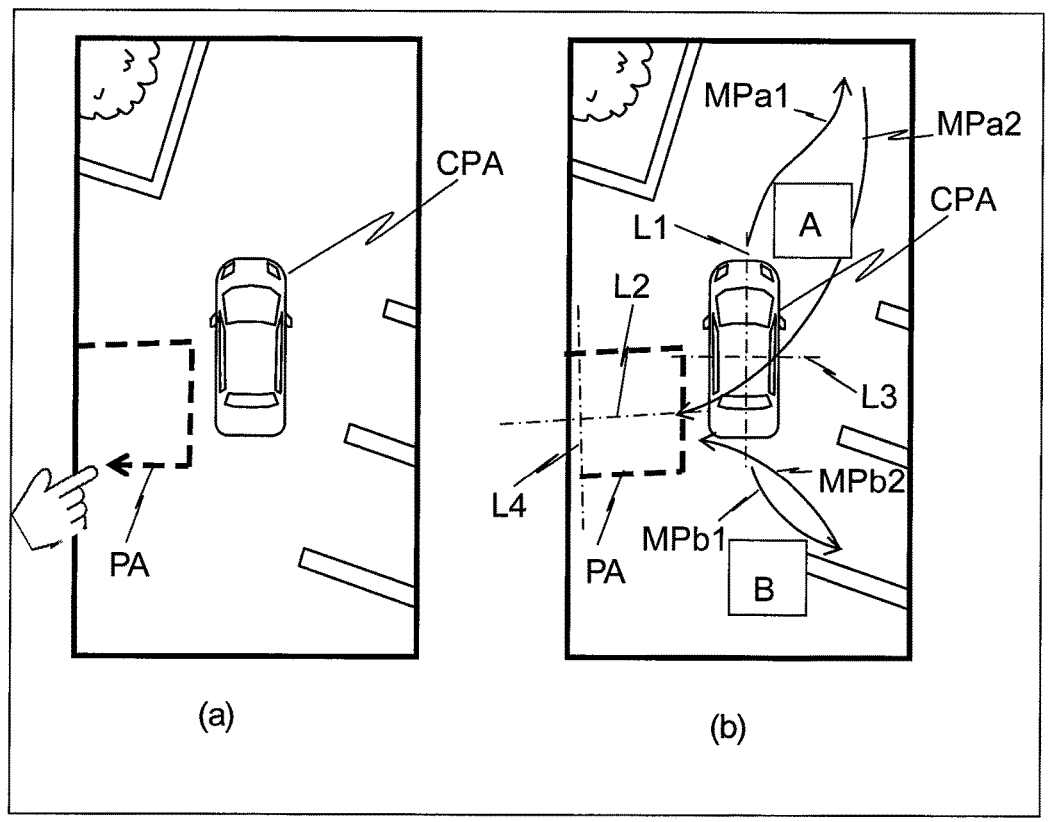
FIG. 7 is a diagram for illustrating an operation conducted when there exist a plurality of moving paths to the target parking area according to one embodiment of the present invention.

In FIG. 4, FIG. 6, and FIG. 7, part (a) indicates the input operation for a parking area conducted in each case, and part (b) indicates an estimated moving path MP.

As a broad outline, for example, the above-mentioned coordinate information on the own vehicle location area CPA and the designated parking area PA on the screen, the longitudinal and lateral lengths of the own vehicle, namely, the vehicle size defined by the length and the width, the turnable radius thereof, a preset speed pattern of the vehicle at the time of the parking operation, and other such information are used. The moving path MP is estimated by moving the vehicle so that a center line L1 of the vehicle within the own vehicle location area CPA matches a center line L2 of the parking area PA along the parking direction of the vehicle. In this case, the estimation is conducted in consideration of a range that allows the own vehicle to move based on the information on the vehicle size, the turnable radius, and the like of the own vehicle described above. In terms of the location of the vehicle within the parking area PA along the longitudinal direction, the estimation is conducted so that a center line L3 of the vehicle along the lateral direction matches a center line L4 of the vehicle within the parking area PA along a direction perpendicular to the parking direction of the vehicle. In this case, it is determined based on the positional relationship between the own vehicle location area CPA at the start time of the operation and the parking area PA whether the vehicle needs to be turned back once after being moved forward first or the vehicle can be parked only by moving backward from the beginning. After that, the center lines are gradually caused to match each other in accordance with the speed pattern of the vehicle at the time of the parking operation.

The reference line is not limited to the center line, and, for example, the reference line along any one of the left and right ends or the reference line along any one of the front and rear ends may be set.

The moving path MP estimated in this manner is transmitted from the moving path calculation unit 31 to the image generation unit 21, and displayed on the display screen 2a for the user by the image generation unit 21 (Step ST109). When there are a plurality of moving paths MP, the plurality of moving paths MP are displayed so as to be selectable by the user. For example, as illustrated in FIG. 7, there are displayed a moving path MPa1→a moving path MPa2 of the turning back involving moving backward after moving forward, which is indicated by the symbol A, and a moving path MPb1→a moving path MPb2 of the turning back involving moving forward after moving backward, which is indicated by the symbol B.

The user designates a desired path from the displayed paths through the input device 2b (Step ST110).

When the moving path MP is designated in this manner, an input signal based on the designation is input to the moving path calculation unit 31, and the moving path MP is determined (Step ST111).

The moving path MP is further input to the vehicle control processing unit 32, and the own vehicle is controlled based on the moving path MP by the vehicle control processing unit 32 (Step ST112).

As further another form, the image generation unit 21 may be configured to display the moving path MP of the own vehicle by moving the own vehicle location area CPA on the display screen 2a based on the slide operation for moving the own vehicle location area mark on the display screen 2a, which is input to the touch panel. The moving path calculation unit 31 may be configured to convert the displayed moving path MP for a display system being the coordinate information on the image display device 2 into the moving path MP for a vehicle control system of the vehicle control device 3. The vehicle control processing unit 32 may be configured to then move the own vehicle along the moving path MP for the vehicle control system.

Second Embodiment

A second embodiment of the present invention includes, in addition to the components of the first embodiment, a sensor configured to enable the vehicle to detect a three-dimensional object around the own vehicle and an alarm device configured to issue a warning when the three-dimensional object exists on the moving path of the own vehicle.

Figure 8:
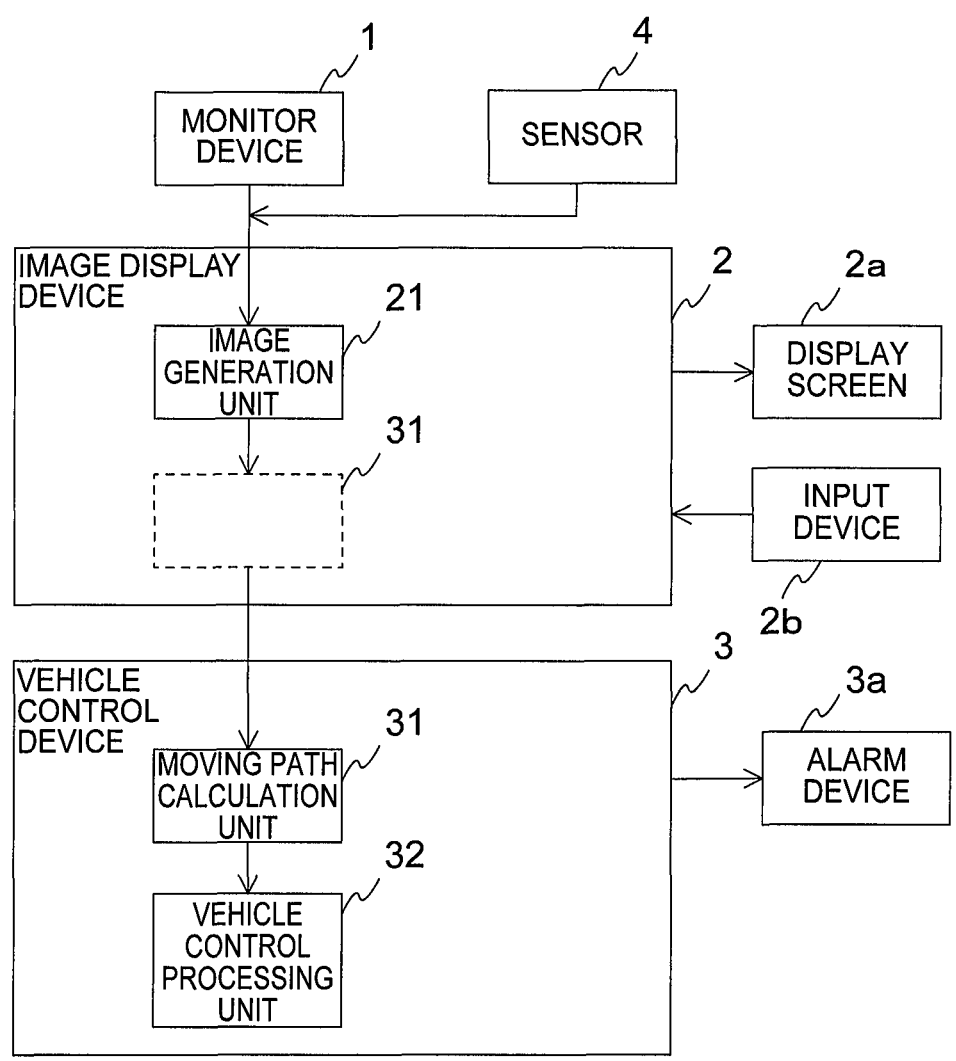
FIG. 8 is a block diagram for illustrating a configuration of an automatic parking apparatus according to a second embodiment of the present invention.

FIG. 8 is a block diagram for illustrating a configuration of an automatic parking apparatus according to the second embodiment of the present invention.

A sensor 4 is a sensor configured to detect the three-dimensional object existing around the own vehicle.

An alarm device 3a is configured to issue a warning when the three-dimensional object detected by the sensor 4 exists on the moving path of the own vehicle.

The other components are the same as those of the first embodiment.

Figure 9:
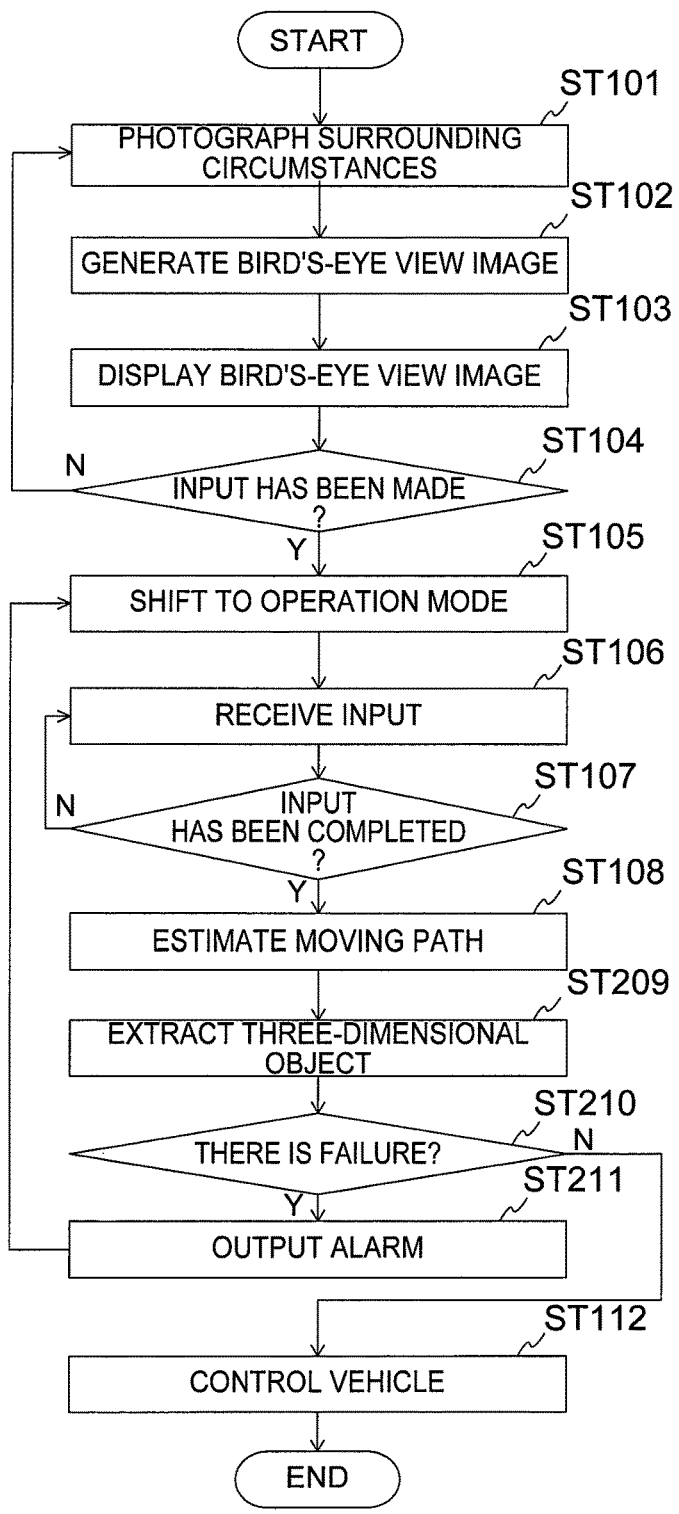
FIG. 9 is a flowchart for illustrating an example of an operation of the automatic parking apparatus according to the second embodiment of the present invention.

FIG. 9 is a flowchart for illustrating an example of an operation of the automatic parking apparatus according to the second embodiment of the present invention. Operations of the respective components illustrated in FIG. 8 are described below.

The processing of Step ST101 to Step ST108 and the processing of Step ST112 are the same as those of the first embodiment.

After the moving path MP is estimated in Step ST108, the three-dimensional object existing around the own vehicle is detected by the sensor 4 (Step ST209). The sensor used in this case may be any sensor that can detect the three-dimensional object through use of ultrasound, millimeter waves, or the like.

A result of detection of the three-dimensional object is transmitted to the moving path calculation unit 31 via the image generation unit 21, and it is determined whether or not the three-dimensional object exists on the estimated moving path MP of the own vehicle (Step ST210). In this case, the fact that the three-dimensional object exists in a bird's-eye view image may be displayed more clearly by the image generation unit 21 and the display screen 2a.

Figure 10:
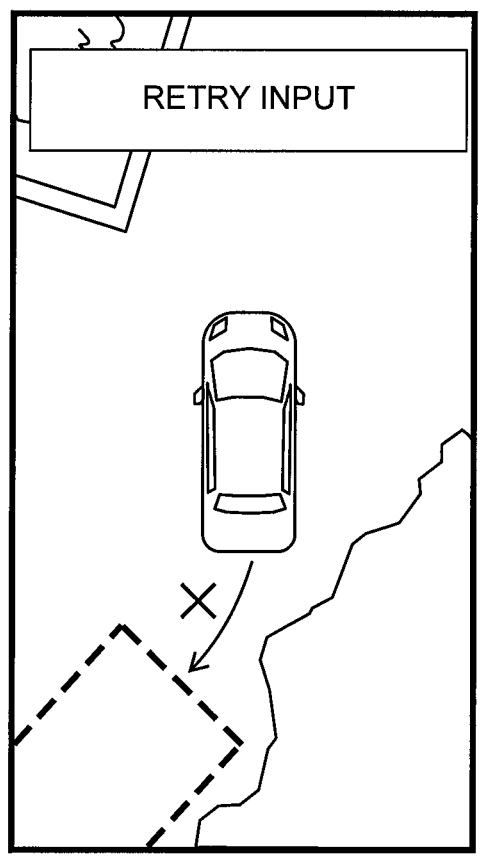
FIG. 10 is a diagram for illustrating an example of a display screen for prompting a user to retry input according to one embodiment of the present invention.

When it is determined that a three-dimensional object X exists on the moving path MP by the moving path calculation unit 31 as illustrated in, for example, part (b) of FIG. 4, the moving path calculation unit 31 issues a warning to the user (Step ST211). The warning may be issued through an on-screen display of the display screen 2a, an output of voice or alarm sound from the alarm device 3a, a combination of both, or the like. In this case, as illustrated in FIG. 10, an indication for prompting the user to retry input may be displayed on the display screen 2a.

Third Embodiment

The automatic parking apparatus according to the above-mentioned first and second embodiments are each an apparatus that is provided with the display screen and the input device in the vicinity of, for example, a driver's seat inside the own vehicle, and is configured to allow the user within the own vehicle to set the parking area and automatically park the own vehicle. In a third embodiment of the present invention, a description is made of a parking guidance apparatus and a parking guidance method according to one embodiment of the present invention for guiding the vehicle to the designated parking area through a remote operation from outside the vehicle through use of an operation-side device configured to communicate to/from a vehicle-side device.

Figure 11:
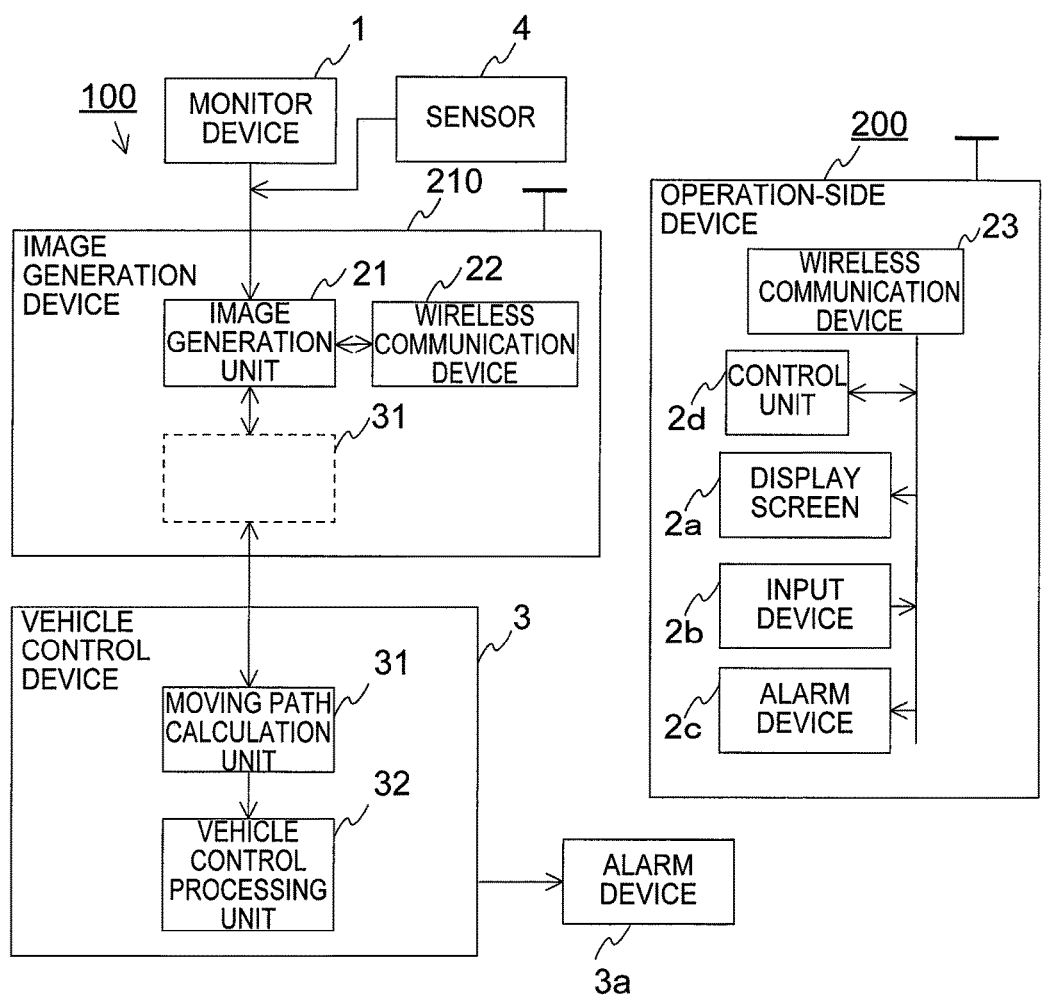
FIG. 11 is a block diagram for illustrating a configuration of a parking guidance apparatus according to a third embodiment of the present invention.

FIG. 11 is a block diagram for illustrating a configuration of a parking guidance apparatus according to the third embodiment of the present invention. Components that are the same as or equivalent to those of the above-mentioned embodiments are denoted by like reference symbols, and duplicate descriptions are omitted. The parking guidance apparatus is different from the automatic parking apparatus according to the above-mentioned first and second embodiments in that the parking guidance apparatus includes a vehicle-side device 100 and an operation-side device 200 for a remote operation, which is mainly provided with the display screen 2a and the input device 2b, and is configured to communicate to/from the vehicle-side device 100.

The parking guidance apparatus is also different in that, on the vehicle-side device 100, the image display device 2 illustrated in, for example, FIG. 8 is formed as an image generation device 210 including the image generation unit 21 and a wireless communication device 22 for communications. The operation-side device 200 includes a wireless communication device 23 for communications in addition to the display screen 2a and the input device 2b. A control unit 2d, which is illustrated as a part in charge of display and input control of the display screen 2a and the input device 2b, is not particularly necessary as long as a control part is built into each of the display screen 2a and the input device 2b. An alarm device 2c is an alarm device provided to the operation-side device 200. The alarm device may be provided to the vehicle-side device 100, the operation-side device 200, or both as necessary.

In the operation in, for example, Step ST103 of FIG. 2, the bird's-eye view image generated by the image generation unit 21 is transmitted from the image generation device 210 of the vehicle-side device 100 to the operation-side device 200 via the wireless communication devices 22 and 23, and displayed on the display screen 2a.

In, for example, Step ST104 to Step ST107, when the input operation is conducted by the user through the input device 2b of the operation-side device 200, a signal indicating the input operation is transmitted to the vehicle-side device 100 through communications. When receiving the signal indicating the input operation, the image generation unit 21 of the vehicle-side device 100 shifts to the user operation mode. Then, the image generation unit 21 transmits a signal for conducting the dedicated display for prompting the user to designate the parking area to the display screen 2a through communications.

In this manner, the display screen 2a conducts the display for prompting the user to designate the parking area. Then, the user conducts a designation input for the parking area through the input device 2b, and when the designation input for the parking area PA is transmitted through communications, the image generation unit 21 receives the designation input. Then, the user conducts the input completion operation, and when the signal indicating the input completion operation is transmitted through communications, the image generation unit 21 determines that the input has been completed.

In, for example, Step ST108 to Step ST112, when the parking area PA is designated, the coordinate information on the own vehicle location area CPA and the designated parking area PA on the screen is input from the image generation unit 21 to the moving path calculation unit 31 of the vehicle control device 3, and the moving path is estimated by the moving path calculation unit 31. The estimated moving path MP is transmitted from the moving path calculation unit 31 to the image generation unit 21, and is further transmitted to the display screen 2a through communications to be displayed. When the user designates a desired path from the displayed paths through the input device 2b, the input signal based on the designation is transmitted to the image generation unit 21 through communications, and further transmitted to the moving path calculation unit 31 via the image generation unit 21, and the moving path is determined by the moving path calculation unit 31. The determined moving path MP is further input to the vehicle control processing unit 32, and the own vehicle is controlled based on the moving path MP by the vehicle control processing unit 32.

After the moving path MP is estimated in Step ST108, in Step ST209 to Step ST211 of FIG. 9, the three-dimensional object existing around the own vehicle is detected by the sensor 4. The result of detection of the three-dimensional object is transmitted to the moving path calculation unit 31 via the image generation unit 21, and it is determined whether or not the three-dimensional object exists on the moving path MP of the own vehicle. When it is determined that the three-dimensional object X exists on the moving path MP, the moving path calculation unit 31 issues a warning to the user. The warning is issued by: transmitting a warning signal to the display screen 2a via the image generation unit 21 through communications such that the warning is displayed on the screen; outputting voice or alarm sound after transmitting a warning signal to each of the alarm devices 3a and 2c; combining both; or conducting other such processing.

In this manner, the vehicle-side device 100 and each of the display screen 2a, the input device 2b, and the alarm device 2c exchange signals with each other via the wireless communication devices 22 and 23. This allows the user to designate the parking area PA and guide the vehicle through a remote operation from outside the vehicle by operating the input device 2b while holding the operation-side device 200 and viewing the display screen 2a.

In the above-mentioned example, the wireless communication devices 22 and 23 are used to conduct the communications between the vehicle-side device 100 and the operation-side device 200 through wireless communications, but instead of a wireless communication device, a wired communication device may be used to conduct wired communications.

In the configurations illustrated in FIG. 1, FIG. 8, and FIG. 11, the moving path calculation unit 31 is provided to the vehicle control device 3, but may be provided on the side of the image display device 2 or the image generation device 210 as indicated by the broken line.

The moving path calculation unit 31 and the vehicle control processing unit 32 of the vehicle control device 3 and the image generation unit 21 of the image display device 2, which are the components illustrated in FIG. 1 and FIG. 8, and the moving path calculation unit 31 and the vehicle control processing unit 32 of the vehicle control device 3 and the image generation unit 21 of the image generation device 210, which are the components illustrated in FIG. 11, may be formed of separate control circuits, or may be collectively formed of a single control circuit.

In this respect, each of processing circuits for achieving functions of the moving path calculation unit 31 and the vehicle control processing unit 32 of the vehicle control device 3 and the image generation unit 21 of the image display device 2, which are the components illustrated in FIG. 1 and FIG. 8, and the moving path calculation unit 31 and the vehicle control processing unit 32 of the vehicle control device 3, the image generation unit 21 of the image generation device 210, and the control unit 2d of the operation-side device 200, which are the components illustrated in FIG. 11, may be configured by dedicated hardware, or may be configured by a central processing unit (CPU; referred to also as "processing unit", "arithmetic unit", "microprocessor", "microcomputer", "processor", or "DSP") for executing a program stored in a memory.

Figure 12:
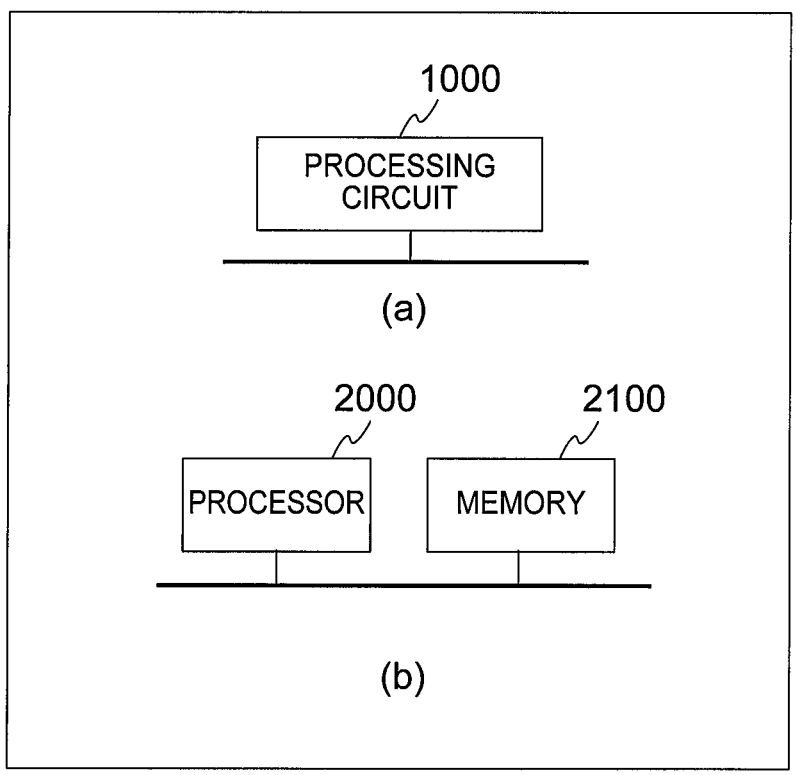
FIG. 12 is a diagram for illustrating an example of hardware configurations of control parts of the automatic parking apparatus and the parking guidance apparatus according to one embodiment of the present invention.

In FIG. 12 for schematically illustrating hardware configurations, part (a) indicates a case where those functions are configured by hardware, and part (b) indicates a case where those functions are configured by software.

When the functions of the respective components described above are configured by hardware illustrated in part (a) of FIG. 12, a processing circuit 1000 corresponds to, for example, a single circuit, a composite circuit, a processor including a program, a processor including a parallel program, ASIC, FPGA, or a combination of those. Each of the functions of the respective components described above may be achieved by the processing circuit, or the functions of the respective components may be collectively achieved by the processing circuit.

When the functions of the respective components described above are configured by the CPU illustrated in part (b) of FIG. 12, the functions of the respective components described above are achieved by software, firmware, or a combination of software and firmware. The software and the firmware are described as programs, and stored in a memory 2100. The processor 2000 being the processing circuit reads and executes the programs stored in the memory 2100, to thereby realize the functions of the respective components. In other words, those programs cause a computer to execute a procedure and a method for the respective components described above. The memory 2100 corresponds to, for example, a non-volatile or volatile semiconductor memory, e.g., a RAM, a ROM, a flash memory, an EPROM, or an EEPROM, or a magnetic disk, a flexible disk, an optical disc, a compact disc, a MiniDisc, or a DVD.

The functions of the respective components described above may be partially achieved by the dedicated hardware, and may be partially achieved by the software or the firmware.

In this manner, the processing circuit can achieve the respective functions described above by the hardware, the software, the firmware, or the combination of those.

Further, different kinds of information required for the processing are set in advance in a circuit in the case of a hardware configuration, and are stored in advance in a memory in the case of a software configuration.

The present invention is not limited to the respective embodiments described above, and includes every possible combination of those.

What is claimed is:

1. An automatic parking apparatus of a vehicle, comprising:
    a monitor device configured to photograph surroundings of the vehicle;
    an image display device comprising:
        a display screen configured to display an image obtained through the photographing by the monitor device;
        a processor configured to generate a new image from the image obtained through the photographing, and to control the display to display the new image; and
        an input device comprising a touch panel on the display screen; and
    a vehicle control device configured to control the vehicle to move to a parking area, which is designated through the input device with respect to the displayed new image,
    wherein the parking area is designated by having an area drawn via the input device or by dragging, via the touch panel, the vehicle displayed in the new image to the area,
    wherein the processor is further configured to control the display screen to display the parking area on the display screen based on input exhibiting a rectangular shape drawn via the touch panel based on the parking area being designated by the area drawn via the input device, and
    wherein the processor is further configured to control the display screen to display the parking area on the display screen based on a slide operation for moving a location area mark of the vehicle at a start time of a parking operation on the display screen, which is input to the touch panel, based on the parking area being designated by the dragging of the vehicle.

2. The automatic parking apparatus according to claim 1, wherein the processor is configured to generate a birds-eye view image from the image obtained through the photographing by the monitor device, and to control the display to display the bird's-eye view image on the display screen.

3. The automatic parking apparatus according to claim 1, further comprising:
    a sensor configured to detect an obstruction around the vehicle,
    wherein the vehicle control device comprises a moving path calculator configured to:
        calculate a moving path of the vehicle from a relationship between the parking area input through the input device and a location area of the vehicle at the start time of the parking operation within the new image; and
        issue an alarm when the obstruction detected by the sensor exists on the moving path.

4. The automatic parking apparatus according to claim 1, further comprising:
    a sensor configured to detect an obstruction around the vehicle,
    wherein:
        the vehicle control device comprises a moving path calculator configured to:

calculate a moving path of the vehicle from a relationship between the parking area input from the input device and a location area of the vehicle at the start time of the parking operation within the new image; and detect that the obstruction detected by the sensor exists on the moving path; and the processor is configured to conduct display for prompting retry of input of the parking area on the display screen when the obstruction is detected on the moving path by the moving path calculator.

5. The automatic parking apparatus according to claim 1, wherein the processor is configured to display, when an actual parking frame exists at a destination of the slide operation on the display screen within the image obtained through the photographing, the parking area at a position satisfying a preset condition within the parking frame, and wherein the preset condition comprises at least one line of the parking area is set to match a line of the parking frame.

6. The automatic parking apparatus according to claim 1, wherein:

the processor is configured to display a moving path of the vehicle by moving the location area of the vehicle at the start time of the parking operation on the display screen based on the slide operation for moving the location area mark of the vehicle at the start time of a parking operation on the display screen which is input to the touch panel; and the vehicle control device comprises:
  a moving path calculator configured to convert the displayed moving path into a moving path for a vehicle control system; and
  a vehicle control processor configured to move the vehicle along the moving path for the vehicle control system.

7. The automatic parking apparatus according to claim 1, wherein:

the processor is further configured to calculate a plurality of moving paths of the vehicle from a relationship between the input parking area and the location area of the vehicle at the start time of the parking operation within the new image, the processor is further configured to control the display to display the plurality of moving paths calculated by the processor on the display screen, one of the plurality of moving paths is selected via the touch screen, and the vehicle control device is a controller which controls the vehicle to automatically move into the parking area without user assistance via the selected one moving path.

8. The automatic parking apparatus according to claim 1, wherein the processor is further configured to determine whether an actual parking frame exists at the parking area designated via the input device, based on white lines demarcations, wherein, based on the processor determining that the actual parking frame exists, automatically correcting the parking area designated via the input device to the actual parking frame, and wherein the vehicle control device automatically controls the vehicle to move into the parking area.

9. An automatic parking method, comprising:
photographing, by a monitor device, surroundings of a vehicle;

generating, by a processor, a new image to be displayed on a display screen obtained from an image obtained through the photographing, and displaying the new image; and controlling the vehicle to move to a parking area, which is designated through an input device with respect to the displayed image, the input device comprising a touch panel on the display screen, wherein the parking area is designated by having an area drawn via the input device or by dragging, via the touch panel, the vehicle displayed in the new image to the area, wherein the displaying of the new image further comprises displaying the parking area on the display screen based on input exhibiting a rectangular shape made to the touch panel when the parking area is designated by having the area drawn via the input device, and wherein the displaying of the new image further comprises displaying the parking area on the display screen based on a slide operation for moving a location area mark of the vehicle at a start time of a parking operation on the display screen, which is input to the touch panel, when the parking area is designated by the dragging of the vehicle.

10. The automatic parking method according to claim 9, wherein the displaying of the new image comprises generating a birds-eye view image from the image obtained through the photographing, and displaying the birds-eye view image.

11. The automatic parking method according to claim 9, wherein the controlling of the vehicle to move comprises:
calculating a moving path of the vehicle from a relationship between the input parking area and a location area of the vehicle at the start time of the parking operation within the new image;
detecting an obstruction on the moving path; and
issuing an alarm when the obstruction exists on the moving path.

12. The automatic parking method according to claim 9, wherein the controlling of the vehicle to move comprises:
calculating a moving path of the vehicle from a relationship between the input parking area and a location area of the vehicle at the start time of the parking operation within the new image;
detecting an obstruction on the moving path; and
conducting display for prompting retry of input of the parking area on the display screen when the obstruction is detected.

13. The automatic parking method according to claim 9, wherein the displaying of the new image further comprises adjusting displaying, when an actual parking frame exists at a destination of the slide operation on the display screen, of the parking area at a position satisfying a preset condition within the parking frame.

14. The automatic parking method according to claim 9, wherein:

the displaying of the new image further comprises displaying a moving path of the vehicle on the display screen based on a slide operation for moving the location area mark of the vehicle at the start time of the parking operation on the display screen, which is input to the touch panel; and the controlling of the vehicle to move comprises:
converting the displayed moving path into a moving path for a vehicle control system; and
moving the vehicle along the converted moving path.

15. A parking guidance apparatus, comprising:
a vehicle-side device; and
an operation-side device comprising a communication device configured to communicate with the vehicle-side device,
  the vehicle-side device comprising:
    a monitor device configured to photograph surroundings of the vehicle;
    an processor configured to generate an image to be displayed on a display screen from an image obtained through the photographing; and
    a vehicle control device configured to control the vehicle to move,
  the operation-side device comprising:
    the display screen configured to display the image generated by the vehicle-side device; and
    an input device comprising a touch panel on the display screen,
wherein the vehicle control device of the vehicle-side device is configured to control the vehicle to move to a parking area, which is designated by the operation-side device through the input device with respect to the new image, and
wherein the parking area is designated by having an area drawn via the input device or by dragging, via the touch panel, the vehicle displayed in the new image to the area,
wherein the processor is further configured to control the display screen to display the parking area on the display screen based on input exhibiting a rectangular shape drawn via the touch panel based on the parking area being designated by the area drawn via the input device, and
wherein the processor is further configured to control the display screen to display the parking area on the display screen based on a slide operation for moving a location area mark of the vehicle at a start time of a parking operation on the display screen, which is input to the touch panel, base don the parking area being designated by the dragging of the vehicle.

16. A parking guidance method to be performed between a vehicle-side device and an operation-side device comprising a communication device configured to communicate with the vehicle-side device, the parking guidance method comprising:
  causing, by the vehicle-side device, a monitor device to photograph surroundings of a vehicle;
  generating, by the vehicle-side device, a new image to be displayed on a display screen from an image obtained through the photographing;
  causing, by the operation-side device, the display screen to display the new image generated by the vehicle-side device;
  designating, by the operation-side device, a parking area through an input device with respect to the new image, the input device comprising a touch panel on the display screen; and
  causing, by the vehicle-side device, a vehicle control device to control the vehicle to move to the parking area designated by the operation-side device,
wherein the designated parking area is designated by having an area drawn via the input device or by dragging, via the touch panel, the vehicle displayed in the new image to the area,
wherein the displaying of the new image further comprises displaying the parking area on the display screen based on input exhibiting a rectangular shape made to the touch panel when the sparking area is designated by having the area drawn via the input device, and
wherein the displaying of the new image further comprises displaying the parking area on the display screen based on a slide operation for moving a location area mark of the vehicle at a start time of a parking operation on the display screen, which is input to the touch panel, when the parking area is designated by the dragging of the vehicle.

* * * * *